(12) United States Patent
Chesneau et al.

(10) Patent No.: US 11,177,505 B2
(45) Date of Patent: Nov. 16, 2021

(54) PYRIDINE SULFUR TRIOXIDE COMPLEXES AS ELECTROLYTE COMPONENT FOR HIGH VOLTAGE BATTERIES

(71) Applicants: BASF SE, Ludwigshafen am Rhein (DE); University of Rhode Island Board of Trustees, Kingston, RI (US)

(72) Inventors: Frederick Francois Chesneau, Ludwigshafen (DE); Arnd Garsuch, Ludwigshafen (DE); Michael Schmidt, Alsbach-Haehnlein (DE); Brett Lucht, Warwick, RI (US); Julien Demeaux, Bruges (FR); Yingnan Dong, Fremont, CA (US); Bo Zhang, Kingston, RI (US)

(73) Assignee: BASF SE, Ludwigshafen am Rhein (DE)

( * ) Notice: Subject to any disclaimer, the term of this patent is extended or adjusted under 35 U.S.C. 154(b) by 137 days.

(21) Appl. No.: 16/475,563

(22) PCT Filed: Jan. 2, 2018

(86) PCT No.: PCT/EP2018/050067
§ 371 (c)(1),
(2) Date: Jul. 2, 2019

(87) PCT Pub. No.: WO2018/127492
PCT Pub. Date: Jul. 12, 2018

(65) Prior Publication Data
US 2019/0326642 A1 Oct. 24, 2019

(30) Foreign Application Priority Data
Jan. 3, 2017 (EP) .................................. 17150187

(51) Int. Cl.
*H01M 10/0567* (2010.01)
*H01M 10/0525* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0025* (2013.01)

(58) Field of Classification Search
CPC ......... H01M 10/0525; H01M 10/0567; H01M 10/0568; H01M 10/0569; H01M 2300/0025
See application file for complete search history.

(56) References Cited

U.S. PATENT DOCUMENTS 4,714,664 A * 12/1987 Laustsen ................. H01M 6/14
429/105

FOREIGN PATENT DOCUMENTS

WO WO 99/28987 A1 6/1999
WO WO 2013/026854 A1 2/2013
WO WO 2013/149073 A1 10/2013

OTHER PUBLICATIONS

International Search Report dated Mar. 29, 2018 in PCT/EP2018/050067 filed Jan. 2, 2018, 4 pages.
International Preliminary Report on Patentability and Written Opinion of the International Searching Authority dated Jul. 9, 2019 in PCT/EP2018/050067 filed Jan. 2, 2018, 7 pages.
Extended European Search Report dated Mar. 16, 2017 in Patent Application No. 17150187.7, 3 pages.
Nicholas Bourne, et al., "Single Transition State for Sulfonato Group (SO₃) Transfer Between Pyridine Nucleophiles" Journal of the American Chemical Society, vol. 107, No. 14, XP055352314, Jul. 1, 1985, pp. 4327-4331.
Ran Elazari, et al., "Rechargeable Lithiated Silicon-Sulfur (SLS) Battery Prototypes" Electrochemistry Communications, vol. 14, Issue 1, Jan. 2012, pp. 21-24.

* cited by examiner

*Primary Examiner* — Gregg Cantelmo
(74) *Attorney, Agent, or Firm* — Lowenstein Sandler LLP

(57) ABSTRACT

An electrolyte composition including (i) at least one aprotic organic solvent; (ii) at least one conducting salt; (iii) at least one pyridine-$SO_3$ complex of formula (I)

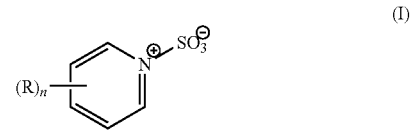

Figure 1:
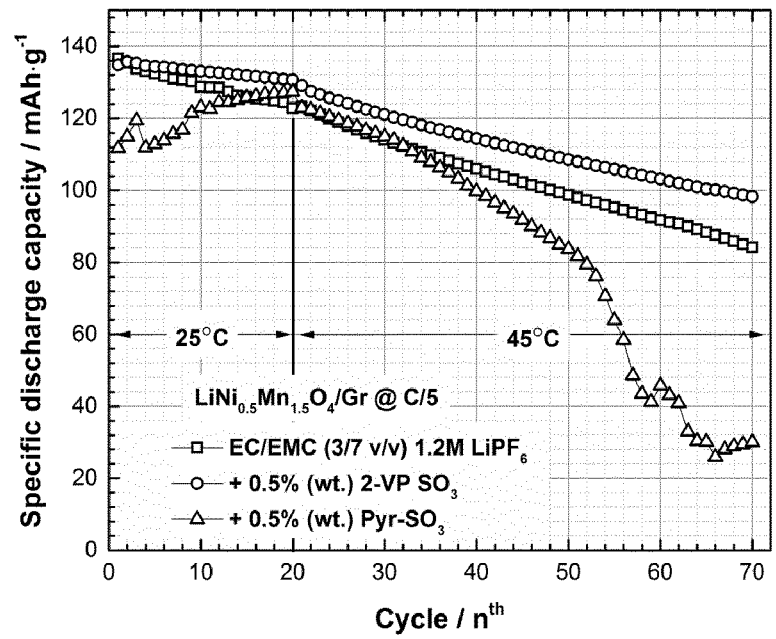
Figure 1:
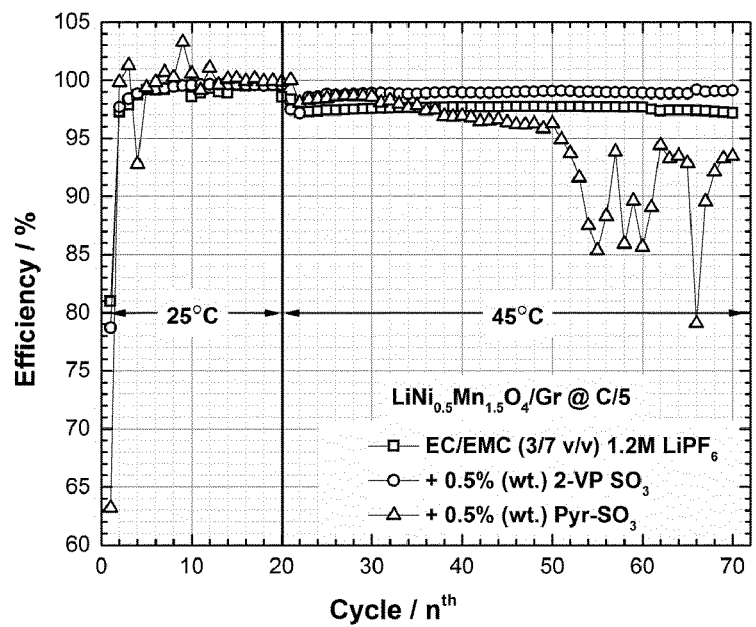

wherein R is selected independently at each occurrence from F, $C_1$ to $C_{10}$ alkyl, $C_2$ to $C_{10}$ alkenyl, and $C_2$ to $C_{10}$ alkynyl, wherein alkyl, alkenyl, and alkynyl may be substituted by one or more substituents selected from F and CN; and n is an integer selected from 1, 2, 3, 4, and 5; and (vi) optionally one or more additives; and its use in electrochemical cells.

14 Claims, 5 Drawing Sheets

PYRIDINE SULFUR TRIOXIDE COMPLEXES AS ELECTROLYTE COMPONENT FOR HIGH VOLTAGE BATTERIES

CROSS-REFERENCE TO RELATED APPLICATION(S)

This application is a national stage entry of PCT Application No. PCT/EP2018/050067 filed on Jan. 2, 2018, the contents of which are incorporated by reference herein in its entirety.

FIELD

The present invention relates to the use of pyridine sulfur trioxide complexes of formula (I)

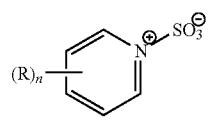

wherein R and n are defined as below, in electrolyte compositions, to electrolyte compositions containing at least one pyridine sulfur trioxide complex of formula (I) for electrochemical cells and to electrochemical cells comprising such electrolyte composition.

BACKGROUND

Storing electrical energy is a subject of still growing interest. Efficient storage of electric energy allows electric energy to be generated when it is advantageous and to be used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

Besides solvent(s) and conducting salt(s) an electrolyte composition usually contains further additives to improve certain properties of the electrolyte composition and of the electrochemical cell comprising said electrolyte composition. Common additives are for example flame retardants, overcharge protection additives and film forming additives which react during first charge/discharge cycle on the electrode surface thereby forming a film on the electrode. The film protects the electrode from direct contact with the electrolyte composition.

Due to their versatile applicability, electrochemical cells like lithium batteries are often used at elevated temperatures e.g. arising in a car exposed to sunlight. At elevated temperatures decomposition reactions in the electrochemical cell take place faster and the electrochemical properties of the cell degrade faster e.g. shown by accelerated capacity fading and increase of internal resistance of the cell.

WO 2013/149073 A1 describes lithium ion batteries including an alkali transition metal oxoanion material like lithium iron phosphate as cathode active material and an electrolyte containing sulfur trioxide amine complex additive. The electrolyte additive is added to delay the thermal decomposition of the electrolyte.

WO 99/28987 A1 discloses the use of certain complex compounds as flame retardant additives for battery electrolytes wherein the complex compounds are capable of generating a fire-retarding gas upon decomposition of the electrolyte. One example of such flame retardant additives is the sulfur trioxide pyridine complex.

BRIEF SUMMARY

It is the object of the present invention to provide an electrolyte composition with good electrochemical properties like long cycle life, storage stability, good rate capability, in particular at elevated temperatures and at high working voltages, e.g. for lithium ion batteries cycled up to at least 4.5 V.

This object is achieved by an electrolyte composition containing
(i) at least one aprotic organic solvent;
(ii) at least one conducting salt;
(iii) at least one pyridine-$SO_3$ complex of formula (I)

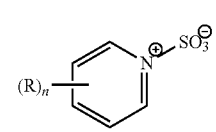

wherein
R is selected independently at each occurrence from F, $OSi(OR^1)_3$, $C_1$ to $C_{10}$ alkyl, $C_2$ to $C_{10}$ alkenyl, and $C_2$ to $C_{10}$ alkynyl, wherein alkyl, alkenyl, and alkynyl may be substituted by one or more substituents selected from F and CN;
$R^1$ is selected independently at each occurrence from $C_1$ to $C_{10}$ alkyl, $C_2$ to $C_{10}$ alkenyl, and $C_2$ to $C_{10}$ alkynyl, wherein alkyl, alkenyl, and alkynyl may be substituted by one or more substituents selected from F and CN; and
n is an integer selected from 1, 2, 3, 4, and 5; and
(vi) optionally one or more additives.

The problem is further solved by the use of at least one pyridine-$SO_3$ complex of formula (I) in electrolyte compositions, and by electrochemical cells comprising such electrolyte compositions.

Electrochemical cells comprising electrolyte compositions containing at least one pyridine-$SO_3$ complex of formula (I) show good properties at elevated temperature like good cycling performance, even if cycled up to a cut-off voltage of 4.8 V.

BRIEF DESCRIPTION OF THE SEVERAL VIEWS OF THE DRAWING(S)

FIG. 1a): Cycling retention of $LiNi_{0.5}Mn_{1.5}O_4$/Graphite cells (C/5, cutoff potentials at 25° C. and 45° C.: 4.80 V-4.25

V vs. LiC$_6$/C$_6$) using the baseline electrolyte without (squares) or with 0.5 wt.-% 2-VP SO$_3$ (circles) and 0.5 wt.-% added Pyr-SO$_3$ (triangles).

FIG. 1b): Coulombic efficiency of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.5 wt.-% 2-VP SO$_3$ (circles) and 0.5 wt.-% added Pyr-SO$_3$ (triangles).

Figure 2:
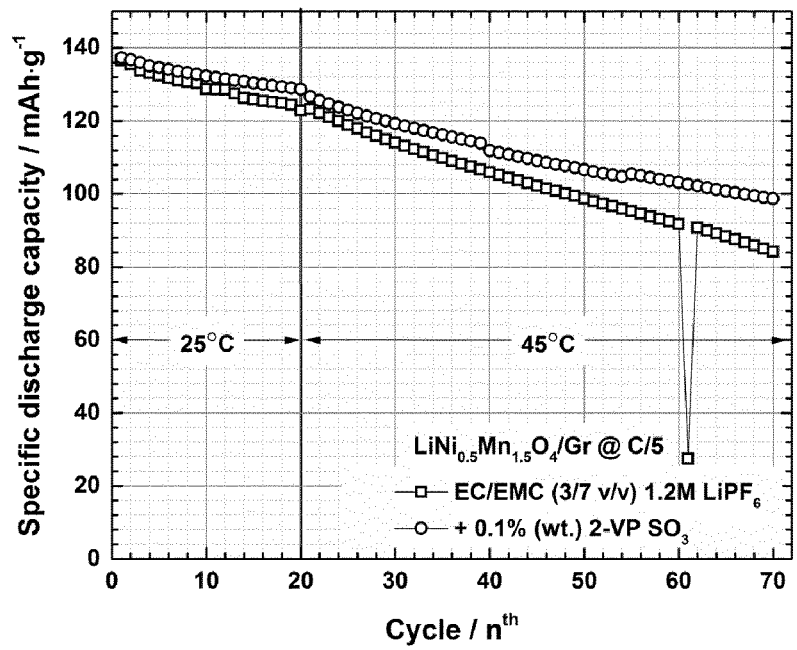
Figure 2:
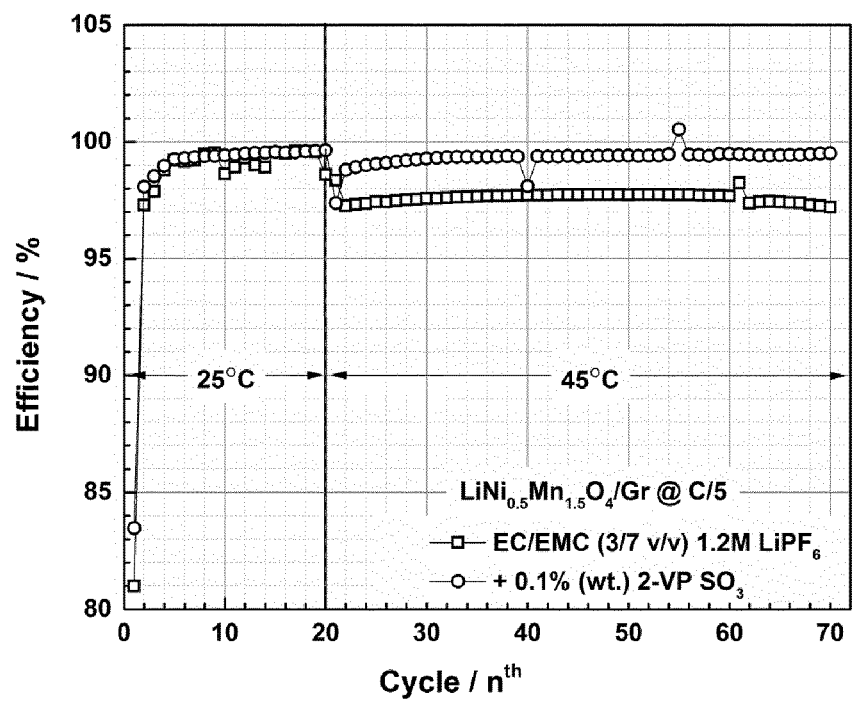

FIG. 2a): Cycling retention of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 2-VP SO$_3$ (circles).

FIG. 2b): Coulombic efficiency of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 2-VP SO$_3$ (circles).

Figure 3:
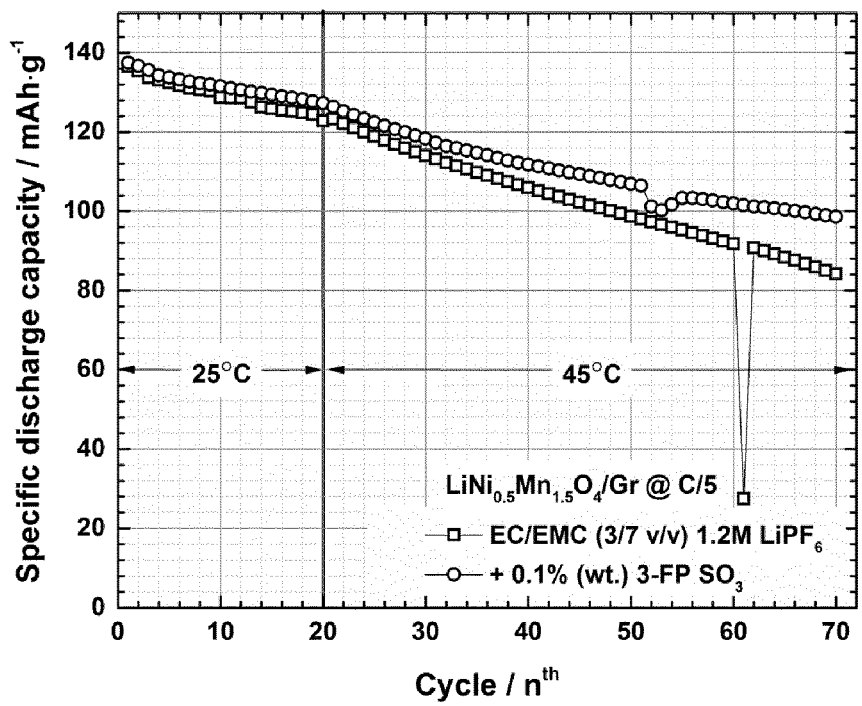
Figure 3:
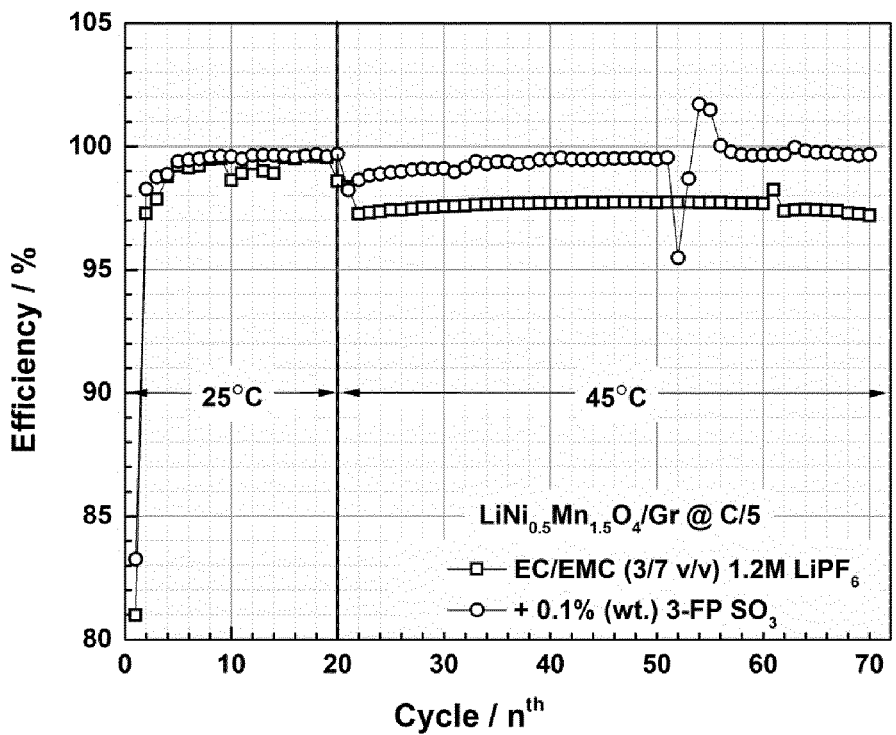

FIG. 3a): Cycling retention of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 3-FP SO$_3$ (circles).

FIG. 3b): Coulombic efficiency of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 3-FP SO$_3$ (circles).

Figure 4:
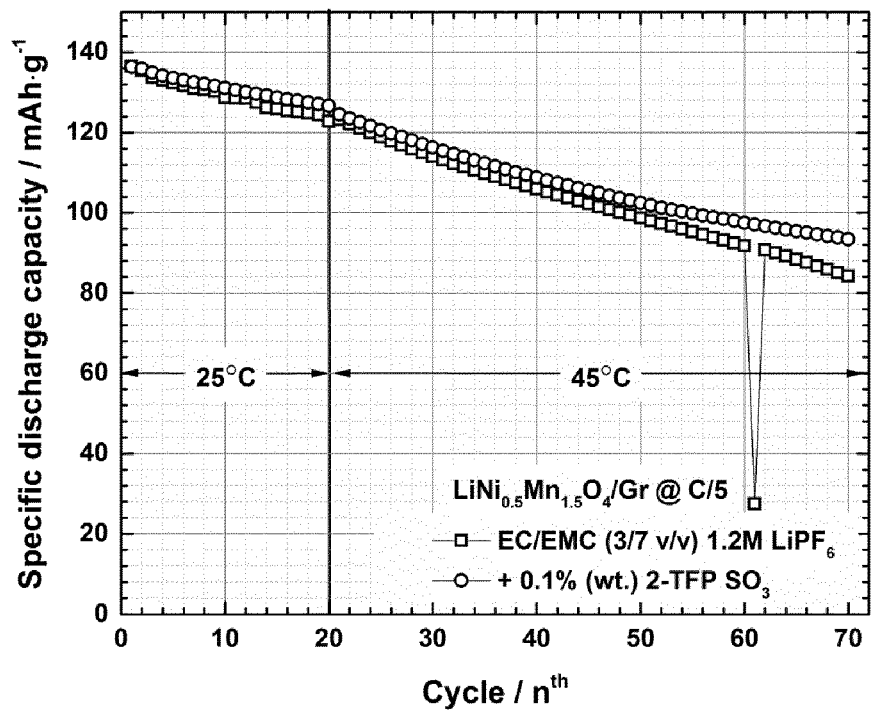
Figure 4:
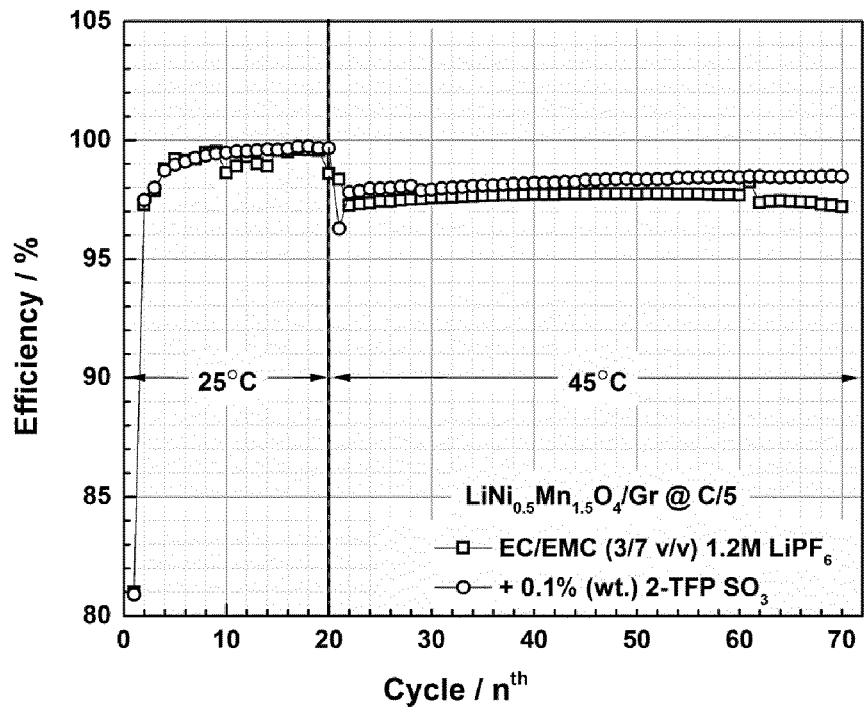

FIG. 4a): Cycling retention of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 2-TFP SO$_3$ (circles).

FIG. 4b): Coulombic efficiency of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 2-TFP SO$_3$ (circles).

Figure 5:
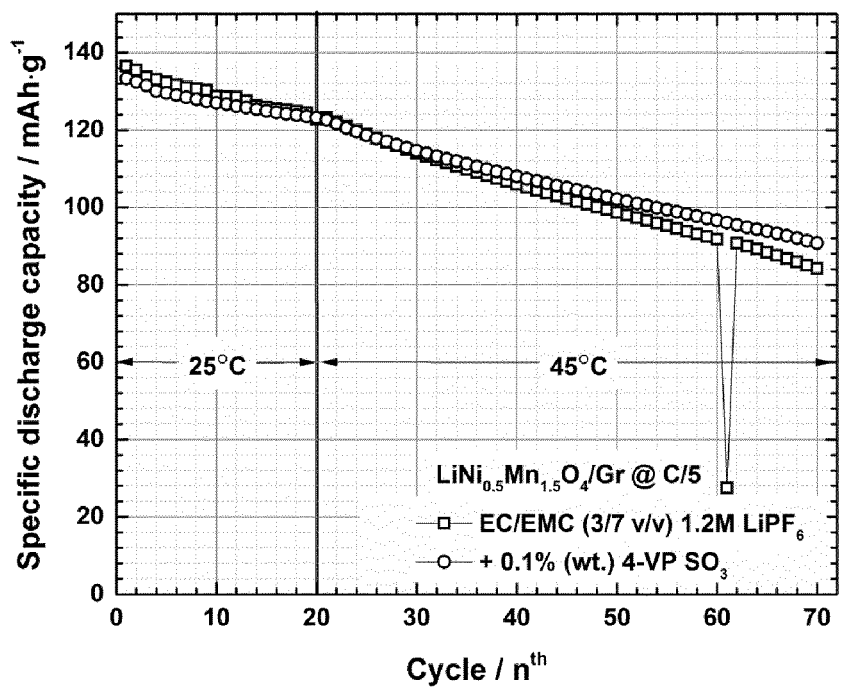
Figure 5:
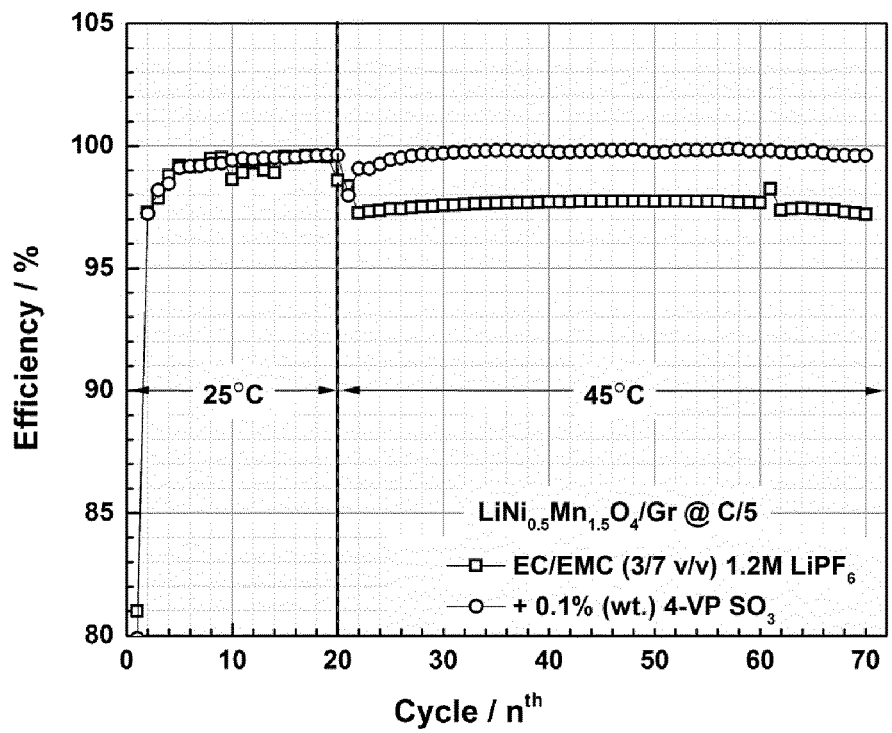

FIG. 5a): Cycling retention of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 4-VP SO$_3$ (circles).

FIG. 5b): Coulombic efficiency of LiNi$_{0.5}$Mn$_{1.5}$O$_4$/Graphite cells (C/5, cutoff potentials at 25° C. and 45° C. 4.80 V~4.25 V vs. LiC$_6$/C$_6$) using the baseline electrolyte without (squares) or with 0.1 wt.-% 4-VP SO$_3$ (circles).

DETAILED DESCRIPTION

The electrolyte composition according to the present invention contains
(i) at least one aprotic organic solvent;
(ii) at least one conducting salt;
(iii) at least one pyridine-SO$_3$ complex of formula (I)

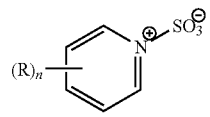

(I)

wherein
R is selected independently at each occurrence from F, OSi(OR$^1$)$_3$, C$_1$ to C$_{10}$ alkyl, C$_2$ to C$_{10}$ alkenyl, and C$_2$ to C$_{10}$ alkynyl, wherein alkyl, alkenyl, and alkynyl may be substituted by one or more substituents selected from F and CN;
R$^1$ is selected independently at each occurrence from C$_1$ to C$_{10}$ alkyl, C$_2$ to C$_{10}$ alkenyl, and C$_2$ to C$_{10}$ alkynyl, wherein alkyl, alkenyl, and alkynyl may be substituted by one or more substituents selected from F and CN; and
n is an integer selected from 1, 2, 3, 4, and 5; and
(vi) optionally one or more additives.

Viewed chemically, an electrolyte composition is any composition that comprises free ions and as a result is electrically conductive. The electrolyte composition functions as a medium that transfers ions participating in the electrochemical reactions taking place in an electrochemical cell. In case of a lithium battery the ion participating in the electrochemical reaction is usually the lithium ion. The most common electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species. In liquid or gel electrolyte compositions the conducting salt is usually solvated in one or more aprotic organic solvents.

The electrolyte composition contains at least one aprotic organic solvent (i). The aprotic organic solvent(s) (i) may be selected from optionally fluorinated aprotic organic solvents, i.e. from fluorinated and non-fluorinated aprotic organic solvents. The electrolyte composition may contain a mixture of fluorinated and non-fluorinated aprotic organic solvents.

The aprotic organic solvent is preferably selected from optionally fluorinated cyclic and acyclic organic carbonates, optionally fluorinated acyclic ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles, and optionally fluorinated cyclic and acyclic phosphates, and mixtures thereof.

Examples of optionally fluorinated cyclic carbonates are ethylene carbonate (EC), propylene carbonate (PC) and butylene carbonate (BC), wherein one or more H may be substituted by F and/or an C$_1$ to C$_4$ alkyl group, e.g. 4-methyl ethylene carbonate, monofluoroethylene carbonate (FEC), and cis- and trans-difluoroethylene carbonate. Preferred optionally fluorinated cyclic carbonates are ethylene carbonate, monofluoroethylene carbonate, and propylene carbonate, in particular ethylene carbonate.

Examples of optionally fluorinated acyclic carbonates are di-C$_1$-C$_{10}$ alkyl carbonates, wherein each alkyl group is selected independently from each other and wherein one or more H may be substituted by F. Preferred are optionally fluorinated di-C$_1$-C$_4$ alkyl carbonates. Examples are e.g. diethyl carbonate (DEC), ethyl methyl carbonate (EMC), 2,2,2-trifluoroethyl methyl carbonate (TFEMC), dimethyl carbonate (DMC), trifluoromethyl methyl carbonate (TFMMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition contains mixtures of optionally fluorinated acyclic organic carbonates and cyclic organic carbonates at a ratio by weight of from 1:10 to 10:1, preferred of from 3:1 to 1:1.

Examples of optionally fluorinated acyclic ethers and polyethers are optionally fluorinated di-C$_1$-C$_{10}$-alkylethers, optionally fluorinated di-C$_1$-C$_4$ alkyl C$_2$-C$_6$ alkylene ethers, optionally fluorinated polyethers, and fluorinated ethers of formula R'—(O—CF$_p$H$_{2-p}$)$_q$—R" wherein R' is a C$_1$-C$_{10}$ alkyl group or a C$_3$-C$_{10}$ cycloalkyl group, wherein one or more H of an alkyl and/or cycloalkyl group are substituted by F; R" is H, F, a C$_1$-C$_{10}$ alkyl group, or a C$_3$-C$_{10}$ cycloalkyl group, wherein one or more H of an alkyl and/or cycloalkyl group are substituted by F; p is 1 or 2; and q is 1, 2 or 3.

According to the invention each alkyl group of the optionally fluorinated di-C$_1$-C$_{10}$ alkylethers is selected independently from the other wherein one or more H of an alkyl group may be substituted by F. Examples of optionally fluorinated di-C$_1$-C$_{10}$ alkylethers are dimethylether, ethylmethylether, diethylether, methylpropylether, diisopropylether, di-n-butylether, 1,1,2,2-tetrafluoroethyl-2,2,3,3-tetrafluoropropyl ether (CF$_2$HCF$_2$CH$_2$OCF$_2$CF$_2$H), and 1H,1H,5H-perfluoropentyl-1,1,2,2-tetrafluoroethylether (CF$_2$H(CF$_2$)$_3$CH$_2$OCF$_2$CF$_2$H).

Examples of optionally fluorinated di-C$_1$-C$_4$ alkyl C$_2$-C$_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable optionally fluorinated polyethers are polyalkylene glycols wherein one or more H of an alkyl or alkylene group may be substituted by F, preferably poly-C$_1$-C$_4$ alkylene glycols and especially polyethylene glycols. Polyethylene glycols may comprise up to 20 mol % of one or more C$_1$-C$_4$ alkylene glycols in copolymerized form. Polyalkylene glycols are preferably dimethyl- or diethyl-end-capped polyalkylene glycols. The molecular weight M$_w$ of suitable polyalkylene glycols and especially of suitable polyethylene glycols may be at least 400 g/mol. The molecular weight M$_w$ of suitable polyalkylene glycols and especially of suitable polyethylene glycols may be up to 5 000 000 g/mol, preferably up to 2 000 000 g/mol.

Examples of fluorinated ethers of formula R'—(O—CF$_p$H$_{2-p}$)$_q$—R" are 1,1,2,2-tetrafluoroethyl-2,2,3,3-tetrafluoropropyl ether (CF$_2$HCF$_2$CH$_2$OCF$_2$CF$_2$H), and 1H,1H,5H-perfluoropentyl-1,1,2,2-tetrafluoroethylether (CF$_2$H(CF$_2$)$_3$CH$_2$OCF$_2$CF$_2$H).

Examples of optionally fluorinated cyclic ethers are 1,4-dioxane, tetrahydrofuran, and their derivatives like 2-methyl tetrahydrofuran wherein one or more H of an alkyl group may be substituted by F.

Examples of optionally fluorinated acyclic acetals are 1,1-dimethoxymethane and 1,1-diethoxymethane. Examples of cyclic acetals are 1,3-dioxane, 1,3-dioxolane, and their derivatives such as methyl dioxolane wherein one or more H may be substituted by F.

Examples of optionally fluorinated acyclic orthocarboxylic acid esters are tri-C$_1$-C$_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane wherein one or more H may be substituted by F.

Examples of optionally fluorinated acyclic esters of carboxylic acids are ethyl and methyl formate, ethyl and methyl acetate, ethyl and methyl proprionate, and ethyl and methyl butanoate, and esters of dicarboxylic acids like 1,3-dimethyl propanedioate wherein one or more H may be substituted by F. An example of a cyclic ester of carboxylic acids (lactones) is γ-butyrolactone.

Examples of optionally fluorinated cyclic and acyclic sulfones are ethyl methyl sulfone, dimethyl sulfone, and tetrahydrothiophene-S,S-dioxide (sulfolane).

Examples of optionally fluorinated cyclic and acyclic nitriles and dinitriles are adipodinitrile, acetonitrile, propionitrile, and butyronitrile wherein one or more H may be substituted by F.

Examples of optionally fluorinated cyclic and acyclic phosphates are trialkyl phosphates wherein one or more H of an alkyl group may be substituted by F like trimethyl phosphate, triethyl phosphate, and tris(2,2,2-trifluoroethyl) phosphate.

More preferred the aprotic organic solvent (i) is selected from optionally fluorinated ethers and polyethers, optionally fluorinated cyclic and acyclic organic carbonates, optionally fluorinated cyclic and acyclic esters and diesters of carboxylic acids and mixtures thereof. Even more preferred the aprotic organic solvent (i) is selected from optionally fluorinated ethers and polyethers, and optionally fluorinated cyclic and acyclic organic carbonates, and mixtures thereof.

The inventive electrolyte composition contains at least one conducting salt (ii). The electrolyte composition functions as a medium that transfers ions participating in the electrochemical reaction taking place in an electrochemical cell. The conducting salt(s) (ii) present in the electrolyte are usually solvated in the aprotic organic solvent(s) (i). Preferably the conducting salt(s) (ii) are selected from lithium salts.

The conducting salt may be selected from the group consisting of

Li[F$_{6-x}$P(C$_y$F$_{2y+1}$)$_x$], wherein x is an integer in the range from 0 to 6 and y is an integer in the range from 1 to 20;

Li[B(R$^I$)$_4$], Li[B(R$^I$)$_2$(OR$^{II}$O)] and Li[B(OR$^{II}$O)$_2$] wherein each R$^I$ is independently from each other selected from F, Cl, Br, I, C$_1$-C$_4$ alkyl, C$_2$-C$_4$ alkenyl, C$_2$-C$_4$ alkynyl, OC$_1$-C$_4$ alkyl, OC$_2$-C$_4$ alkenyl, and OC$_2$-C$_4$ alkynyl wherein alkyl, alkenyl, and alkynyl may be substituted by one or more OR$^{III}$, wherein R$^{III}$ is selected from C$_1$-C$_6$ alkyl, C$_2$-C$_6$ alkenyl, and C$_2$-C$_6$ alkynyl, and (OR$^{II}$O) is a bivalent group derived from a 1,2- or 1,3-diol, a 1,2- or 1,3-dicarboxylic acid or a 1,2- or 1,3-hydroxycarboxylic acid, wherein the bivalent group forms a 5- or 6-membered cycle via the both oxygen atoms with the central B-atom;

LiClO$_4$; LiAsF$_6$; LiCF$_3$SO$_3$; Li$_2$SiF$_6$; LiSbF$_6$; LiAlCl$_4$, Li(N(SO$_2$F)$_2$), lithium tetrafluoro (oxalato) phosphate; lithium oxalate; and salts of the general formula Li[Z(C$_n$F$_{2n+1}$SO$_2$)$_m$], where m and n are defined as follows:
m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-diols from which the bivalent group (OR$^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated C$_1$-C$_4$ alkyl group. An example for such 1,2- or 1,3-diole is 1,1,2,2-tetra(trifluoromethyl)-1,2-ethane diol.

"Fully fluorinated C$_1$-C$_4$ alkyl group" means, that all H-atoms of the alkyl group are substituted by F.

Suited 1,2- or 1,3-dicarboxylic acids from which the bivalent group (OR$^{II}$O) is derived may be aliphatic or aromatic, for example oxalic acid, malonic acid (propane- 1,3-dicarboxylic acid), phthalic acid or isophthalic acid, preferred is oxalic acid. The 1,2- or 1,3-dicarboxylic acids are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group ($OR^{II}O$) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of $Li[B(R^I)_4]$, $Li[B(R^I)_2(OR^{II}O)]$ and $Li[B(OR^{II}O)_2]$ are $LiBF_4$, lithium difluoro oxalato borate and lithium dioxalato borate.

Preferably the at least one conducting salt (ii) is selected from $LiPF_6$, $LiAsF_6$, $LiSbF_6$, $LiCF_3SO_3$, $LiBF_4$, lithium bis(oxalato) borate, lithium difluoro(oxalato) borate, $LiClO_4$, $LiN(SO_2C_2F_5)_2$, $LiN(SO_2CF_3)_2$, $LiN(SO_2F)_2$, and $LiPF_3(CF_2CF_3)_3$, more preferred $LiPF_6$, $LiBF_4$, and $LiPF_3(CF_2CF_3)_3$, more preferred the conducting salt is selected from $LiPF_6$ and $LiBF_4$, and the most preferred conducting salt is $LiPF_6$.

The at least one conducting salt is usually present at a minimum concentration of at least 0.1 mol/l, preferably the concentration of the at least one conducting salt is 0.5 to 2 mol/l based on the entire electrolyte composition.

The electrolyte composition of the present invention contains at least one pyridine-$SO_3$ complex of formula (I) as component (iii)

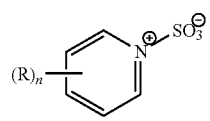

(I)

wherein
R is selected independently at each occurrence from F, $OSi(OR^1)_3$, $C_1$ to $C_{10}$ alkyl, $C_2$ to $C_{10}$ alkenyl, and $C_2$ to $C_{10}$ alkynyl, wherein alkyl, alkenyl, and alkynyl may be substituted by one or more substituents selected from F and CN;
$R^1$ is selected independently at each occurrence from $C_1$ to $C_{10}$ alkyl, $C_2$ to $C_{10}$ alkenyl, and $C_2$ to $C_{10}$ alkynyl, wherein alkyl, alkenyl, and alkynyl may be substituted by one or more substituents selected from F and CN; and
n is an integer selected from 1, 2, 3, 4, and 5.

The term "$C_1$-$C_{10}$ alkyl" as used herein means a straight or branched saturated hydrocarbon group with 1 to 10 carbon atoms having one free valence, e.g., methyl, ethyl, n-propyl, isopropyl, n-butyl, isobutyl, tert-butyl, n-pentyl, iso-pentyl, 2,2-dimethylpropyl, n-hexyl, n-heptyl, n-octyl, n-octyl, n-nonyl, n-decyl, and the like. Preferred are $C_1$-$C_6$ alkyl, more preferred are $C_1$-$C_4$ alkyl like methyl, ethyl, and n- and iso-propyl, and n-butyl and most preferred is methyl.

The term "$C_2$-$C_{10}$ alkenyl" as used herein refers to an unsaturated straight or branched hydrocarbon group with 2 to 10 carbon atoms having one free valence. Unsaturated means that the alkenyl group contains at least one C—C double bond. $C_2$-$C_{10}$ alkenyl includes for example ethenyl, 1-propenyl, 2-propenyl, 1-n-butenyl, 2-n-butenyl, iso-butenyl, 1-pentenyl, 1-hexenyl, and the like. Preferred are $C_2$-$C_6$ alkenyl groups, more preferred are $C_2$-$C_4$ alkenyl groups, most preferred are ethenyl and propenyl, in particular 1-propen-3-yl, also called allyl.

The term "$C_2$ to $C_{10}$ alkynyl" as used herein refers to an unsaturated straight or branched hydrocarbon group with 2 to 10 carbon atoms having one free valence, wherein the hydrocarbon group contains at least one C—C triple bond. $C_2$-$C_{10}$ alkynyl includes for example ethynyl, propynyl, 1-n-butinyl, 2-n-butynyl, iso-butynyl, 1-pentynyl, 1-hexynyl, and the like. Preferred are $C_2$-$C_6$ alkynyl, more preferred are $C_2$-$C_4$ alkynyl, e.g ethynyl, 1-propyn-3-yl ($CCCH_3$, also called propargyl) and but-2-yn-1-yl ($CH_2CCCH_3$).

According to one embodiment at least one R is selected from $C_1$ to $C_{10}$ alkyl, preferably $C_1$ to $C_6$ alkyl, and more preferred $C_1$ to $C_4$ alkyl wherein the alkyl may be substituted by one or more additional substituents selected from F and CN, preferably the alkyl is substituted by F. Examples are from methyl, ethyl, n-propyl, i-propyl, n-butyl, 2-methyl propyl, and t-butyl, which may be substituted by one or more additional substituents selected from F and CN like trifluoromethyl, $CF_3CH_2$, and $CF_3CF_2$.

According to a another embodiment, R is selected from $C_2$ to $C_{10}$ alkenyl which may be substituted by one or more substituents selected from F and CN, preferably R is selected from $C_2$ to $C_6$ alkenyl which may be substituted by one or more substituents selected from F and CN, and more preferred R is selected from $C_2$ to $C_4$ alkenyl which may be substituted by one or more substituents selected from F and CN, e.g. R is selected from ethenyl, propenyl and butenyl which may be substituted by one or more substituents selected from F and CN.

According to a further embodiment R is selected from $C_2$ to $C_{10}$ alkynyl which may be substituted by one or more substituents selected from F and CN, preferably R is selected from $C_2$ to $C_6$ alkynyl which may be substituted by one or more substituents selected from F and CN, more preferred R is selected from $C_2$ to $C_4$ alkynyl which may be substituted by one or more substituents selected from F and CN, e.g. R is selected from methyl, ethyl, propyl and butyl which may be substituted by one or more substituents selected from F and CN.

According to another embodiment at least one R is F.

According to another embodiment at least one R is $OSi(OR^1)_3$. $R^1$ is selected independently at each occurrence from $C_1$ to $C_{10}$ alkyl, $C_2$ to $C_{10}$ alkenyl, and $C_2$ to $C_{10}$ alkynyl, wherein alkyl, alkenyl, and alkynyl may be substituted by one or more substituents selected from F and CN, preferably $R^1$ is selected independently at each occurrence from $C_1$ to $C_{10}$ alkyl, which may be substituted by one or more substituents selected from F and CN, more preferred $R^1$ is selected independently at each occurrence from $C_1$ to $C_6$ alkyl, which may be substituted by one or more substituents selected from F and CN, e.g. $R^1$ is selected independently at each occurrence from methyl, ethyl, n-propyl, i-propyl, n-butyl, t-butyl, n-pentyl, i-pentyl, and n-hexyl. Examples of R selected from $OSi(OR^1)_3$ are trimethyl silyl and triethyl silyl.

n is an integer selected from 1, 2, 3, 4, and 5, preferably n is 1 or 2, more preferred n is 1.

Examples of pyridine-$SO_3$ complexes of formula (I) are 2-vinyl pyridine sulfur trioxide, 3-vinyl pyridine sulfur trioxide, 4-vinyl pyridine sulfur trioxide, 2-trifluoromethyl pyridine sulfur trioxide, 3-trifluoromethyl pyridine sulfur trioxide, 4-trifluoromethyl pyridine sulfur trioxide, 2-fluoro pyridine sulfur trioxide, 3-fluoro pyridine sulfur trioxide, 4-fluoro pyridine sulfur trioxide, 2-propargyl pyridine sulfur trioxide, 3-propargyl pyridine sulfur trioxide, 4-propargyl pyridine sulfur trioxide, 2-trimethylsilyl pyridine sulfur trioxide, 3-trimethylsilyl pyridine sulfur trioxide, and 4-trimethylsilyl pyridine sulfur trioxide.

The preparation of the pyridine-$SO_3$ complexes of formula (I) is known to the person skilled in the art. The pyridine-$SO_3$ complexes of formula (I) may for example be prepared by reaction of the respective of the respective pyridine compound with $SO_3$.

The concentration of the pyridine-$SO_3$ complexes of formula (I) in the electrolyte composition according to the present invention is usually at least 0.01 wt.-%, based on the total weight of the electrolyte composition. The upper limit of the concentration of the pyridine-$SO_3$ complexes of formula (I) in the electrolyte composition is usually 5 wt.-%. Preferably, the concentration is in the range of 0.01 to 5 wt.-%, more preferred in the range of 0.01 to 2 wt.-%, and most preferred in the range of 0.05 to 1 wt.-% based on the total weight of the electrolyte composition.

A further object of the present invention is the use of pyridine-$SO_3$ complexes of formula (I) in electrolyte compositions, e.g. as additive. Preferably pyridine-$SO_3$ complexes of formula (I) are used as film forming additive in electrolyte compositions. They may be used as anode film forming additive and as cathode film forming additive. Their use leads to better cycling properties at elevated temperatures even at high cycling voltages.

Pyridine-$SO_3$ complexes of formula (I) are usually used by adding the desired amount of the pyridine-$SO_3$ complex to the electrolyte composition. Pyridine-$SO_3$ complexes of formula (I) are usually used in the electrolyte composition in the concentrations described above and as described as preferred.

The electrolyte composition according to the present invention optionally contains at least one further additive (iv). The additive(s) (iv) may be selected from SEI forming additives, flame retardants, overcharge protection additives, wetting agents, HF and/or $H_2O$ scavenger, stabilizer for $LiPF_6$ salt, ionic salvation enhancer, corrosion inhibitors, gelling agents, and the like. The one or more additives (iv) are different from pyridine-$SO_3$ complexes of formula (I).

Examples of flame retardants are organic phosphorous compounds like cyclophosphazenes, organic phosphoramides, organic phosphites, organic phosphates, organic phosphonates, organic phosphines, and organic phosphinates, and fluorinated derivatives thereof.

Examples of cyclophosphazenes are ethoxypentafluorocyclotriphosphazene, available under the trademark Phoslyte™ E from Nippon Chemical Industrial, hexamethylcyclotriphosphazene, and hexamethoxycyclotriphosphazene, preferred is ethoxypentafluorocyclotriphosphazene. An example of an organic phosphoramide is hexamethyl phosphoramide. An example of an organic phosphite is tris(2,2,2-trifluoroethyl) phosphite. Examples of organic phosphates are trimethyl phosphate, trimethyl phosphate, tris(2,2,2-trifluoroethyl)phosphate, bis(2,2,2-trifluoroethyl)methyl phosphate, and triphenyl phosphate Examples of organic phosphonates are dimethyl phosphonate, ethyl methyl phosphonate, methyl n-propyl phosphonate, n-butyl methyl phosphonate, diethyl phosphonate, ethyl n-propyl phosphonate, ethyl n-butyl phosphonate, di-n-propyl phosphonate, n-butyl n-propyl phosphonate, di-n-butyl phosphonate, and bis(2,2,2-trifluoroethyl) methyl phosphonate. An example of an organic phosphine is triphenyl phosphine. Examples of organic phosphinates are dimethyl phosphinate, diethyl phosphinate, di-n-propyl phosphinate, trimethyl phosphinate, trimethyl phosphinate, and tri-n-propyl phosphinate.

Examples of HF and/or $H_2O$ scavenger are optionally halogenated cyclic and acyclic silylamines.

A SEI forming additive according to the present invention is a compound which decomposes on an electrode to form a passivation layer on the electrode which prevents degradation of the electrolyte and/or the electrode. In this way, the lifetime of a battery is significantly extended. The term "SEI" means "solid electrolyte interface". SEI forming additives are also named film forming additives and the two terms are used interchangeably herein. Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a lithium-ion containing cathode, for example lithium cobalt oxide, and an electrolyte containing a small amount of said compound, typically from 0.1 to 10 wt.-% of the electrolyte composition, preferably from 0.2 to 5 wt.-% of the electrolyte composition. Upon application of a voltage between anode and cathode, the differential capacity of the electrochemical cell is recorded between 0.5 V and 2 V vs. a Lithium metal reference. If a significant differential capacity is observed during the first cycle, for example −150 mAh/V at 1 V, but not or essentially not during any of the following cycles in said voltage range, the compound can be regarded as SEI forming additive. SEI forming additives per se are known to the person skilled in the art.

Examples of SEI forming additives are cyclic carbonates containing at least one double bond like vinylene carbonate and its derivatives; fluorinated ethylene carbonate and its derivatives like monofluoroethylene carbonate, cis- and trans-difluorocarbonate; cyclic esters of sulfur containing acids like propane sultone and its derivatives and ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and sulfur containing additives as described in detail in WO 2013/026854 A1, in particular the sulfur containing additives shown on page 12 line 22 to page 15, line 10.

The cyclic carbonates containing at least one double bond include cyclic carbonates wherein a double bond is part of the cycle like vinylene carbonate and its derivatives, e.g. methyl vinylene carbonate and 4,5-dimethyl vinylene carbonate; and cyclic carbonate wherein the double bond is not part of the cycle, e.g. methylene ethylene carbonate, 4,5-dimethylene ethylene carbonate, vinyl ethylene carbonate, and 4,5-divinyl ethylene carbonate. Preferred cyclic carbonates containing at least one double bond are vinylene carbonate, methylene ethylene carbonate, 4,5-dimethylene ethylene carbonate, vinyl ethylene carbonate, and 4,5-divinyl ethylene carbonate, most preferred is vinylene carbonate.

Examples of cyclic esters of sulfur containing acids include cyclic esters of sulfonic acid like propane sultone and its derivatives, methylene methane disulfonate and its derivatives, and propene sultone and its derivatives; and cyclic esters derived from sulfurous acid like ethylene sulfite and its derivatives. Preferred cyclic esters of sulfur containing acids are propane sultone, propene sultone, methylene methane disulfonate, and ethylene sulfite.

Preferred SEI-forming additives are oxalato borates, fluorinated ethylene carbonate and its derivatives, cyclic carbonates containing at least one double bond, and cyclic esters of sulfur containing acids. More preferred the electrolyte composition contains at least one additive selected from cyclic carbonates containing at least one double bond and cyclic esters of sulfur containing acids. The electrolyte composition may contain at least one additive selected from cyclic carbonates containing at least one double bond and cyclic esters of sulfur containing acids or at least one additive selected from cyclic carbonates containing at least one double bond and at least one additive selected from cyclic esters of sulfur containing acids. If the electrolyte composition contains a SEI forming additive (iv) it is usually present in a concentration of from 0.1 to 10 wt.-%, preferably of from 0.2 to 5 wt.-% of the electrolyte composition.

Examples of overcharge protection additives are cyclohexylbenzene, biphenyl, o-terphenyl and p-terphenyl.

Examples of gelling agents are polymers like polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. These polymers are added to the electrolytes in order to convert liquid electrolytes into quasi-solid or solid electrolytes and thus to improve solvent retention, especially during ageing.

A compound added as additive (iv) may have more than one effect in the electrolyte composition and the device comprising the electrolyte composition. E.g. lithium oxalato borate may be added as additive enhancing the SEI formation but it may also be added as conducting salt.

According to one embodiment of the present invention the electrolyte composition contains at least one additive (iv). Preferably the electrolyte composition contains at least one additive (iv) selected from film forming additives, flame retardants, overcharging additives, wetting agents, HF and/or $H_2O$ scavenger, stabilizer for $LiPF_6$ salt, ionic solvation enhancer, corrosion inhibitors, and gelling agents.

A preferred electrolyte composition contains
(i) at least 74.99 wt.-% of at least one organic aprotic solvent;
(ii) 0.1 to 25 wt.-% of at least one conducting salt;
(iii) 0.01 to 5 wt.-% pyridine-$SO_3$ complexes of formula (I); and
(iv) 0 to 25 wt.-% of at least one additive,
based on the total weight of the electrolyte composition.

The electrolyte composition is non-aqueous. The water content of the inventive electrolyte composition is preferably below 100 ppm, based on the weight of the electrolyte composition, more preferred below 50 ppm, most preferred below 30 ppm. The water content may be determined by titration according to Karl Fischer, e.g. described in detail in DIN 51777 or ISO760: 1978.

The content of HF of the inventive electrolyte composition is preferably below 100 ppm, based on the weight of the electrolyte composition, more preferred below 50 ppm, most preferred below 30 ppm. The HF content may be determined by titration according to potentiometric or potentiographic titration method.

The electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C. Such liquid electrolyte compositions are particularly suitable for outdoor applications, for example for use in automotive batteries.

The electrolyte compositions of the invention are prepared by methods which are known to the person skilled in the field of the production of electrolytes, generally by dissolving the conductive salt(s) (ii) in the corresponding solvent(s) (i) and adding one or more pyridine-$SO_3$ complexes of formula (I) (iii) and optionally one or more additives (iv), as described above.

The electrolyte compositions may be used in electrochemical cells, preferred they are used in a lithium battery, a double layer capacitor, or a lithium ion capacitor, more preferred they are used in lithium batteries, even more preferred in secondary lithium cells and most preferred in secondary lithium ion batteries.

The invention further provides an electrochemical cell comprising the electrolyte composition as described above or as described as being preferred.

The electrochemical cell may be a lithium battery, a double layer capacitor, or a lithium ion capacitor.

The general construction of such electrochemical cell is known and is familiar to the person skilled in this art—for batteries, for example, in Linden's Handbook of Batteries (ISBN 978-0-07-162421-3).

Preferably the electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds; e.g. the lithium battery may be a lithium ion battery, a lithium/sulphur battery, or a lithium/selenium sulphur battery.

In particular preferred the electrochemical device is a lithium ion battery, i.e. a secondary lithium ion electrochemical cell comprising a cathode comprising a cathode active material that can reversibly occlude and release lithium ions and an anode comprising an anode active material that can reversibly occlude and release lithium ions. The terms "secondary lithium ion electrochemical cell" and "(secondary) lithium ion battery" are used interchangeably within the present invention.

The at least one cathode active material preferably comprises a material capable of occluding and releasing lithium ions selected from lithiated transition metal phosphates and lithium ion intercalating metal oxides.

Examples of lithiated transition metal phosphates are $LiFePO_4$, $LiMnPO_4$, $LiNiPO_4$ and $LiCoPO_4$, examples of lithium ion intercalating metal oxides are $LiCoO_2$, $LiNiO_2$, $LiMnO_2$, mixed lithium transition metal oxides containing Mn and at least one second transition metal; and lithium intercalating mixed oxides containing Ni, Al and at least one second transition metal mixed oxides.

Examples of mixed lithium transition metal oxides containing Mn and at least one second transition metal are mixed lithium transition metal oxides with layer structure having the general formula $Li_{1+e}(Ni_aCo_bMn_cM_d)_{1-e}O_2$
wherein
a is in the range of from 0.05 to 0.9, preferred in the range of 0.1 to 0.8,
b is in the range of from zero to 0.35,
c is in the range of from 0.1 to 0.9, preferred in the range of 0.2 to 0.8,
d is in the range of from zero to 0.2, e is in the range of from zero to 0.3, preferred in the range of > zero to 0.3, more preferred in the range of 0.05 to 0.3, with a+b+c+d=1, and M being one or more metals selected from Na, K, Al, Mg, Ca, Cr, V, Mo, Ti, Fe, W, Nb, Zr, and Zn; and manganese-containing spinels like $LiMnO_4$ and spinels of general formula $Li_{1+t}M_{2-t}O_{4-d}$ wherein d is 0 to 0.4, t is 0 to 0.4 and M is Mn and at least one further metal selected from the group consisting of Co and Ni.

Examples of such mixed lithium transition metal oxides with layer structure are $LiNi_{0.33}Mn_{0.67}O_2$, $LiNi_{0.25}Mn_{0.75}O_2$, $LiNi_{0.35}Co_{0.15}Mn_{0.5}O_2$, $LiNi_{0.21}Co_{0.08}Mn_{0.71}O_2$, $LiNi_{0.22}Co_{0.12}Mn_{0.66}O_2$, $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, $LiNi_{0.6}Co_{0.2}Mn_{0.2}O_2$, and $LiNi_{0.5}Co_{0.2}Mn_{0.3}O_2$.

Further examples of mixed lithium transition metal oxides containing Mn and at least one second transition metal are manganese-containing spinels of formula $Li_{1+t}M_{2-t}O_{4-s}$ wherein s is 0 to 0.4, t is 0 to 0.4, and M is Mn and at least one further metal selected from Co and Ni, preferably M is Mn and Ni and optionally Co, i.e. a part of M is Mn and another part of Ni, and optionally a further part of M is selected from Co.

Examples of lithium intercalating mixed oxides containing Ni, Al and at least one second transition metal mixed oxides are compounds of formula $Li[Ni_hCo_iAl_j]O_2$ wherein h is 0.7 to 0.9, preferred 0.8 to 0.87, and more preferred 0.8 to 0.85;

i is 0.15 to 0.20; and j is 0.02 to 10, preferred 0.02 to 1, more preferred 0.02 to 0.1, and most preferred 0.02 to 0.03.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinylidene chloride, polyvinyl chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylonitrile.

The anode comprised within the lithium batteries of the present invention comprises an anode active material that can reversibly occlude and release lithium ions or is capable to form an alloy with lithium. For example, carbonaceous material that can reversibly occlude and release lithium ions can be used as anode active material. Carbonaceous materials suited are crystalline carbon materials such as graphite materials like natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber. Some carbonaceous materials usable as anode active materials are prone to deterioration by propylene carbonate if propylene carbonate is present in the electrolyte composition. This deterioration is usually caused by intercalation of propylene carbonate molecules into the carbonaceous material during electrochemical cycling of the cell. The intercalation of the propylene molecules leads to exfoliation of layers of the carbonaceous material. For instance graphite materials are very easily destroyed by exfoliation due to intercalation of propylene carbonate. Usually carbonaceous materials comprising at least partially graphitic layers are prone to such deterioration caused by propylene carbonate present in the electrolyte composition during cycling. In order to determine whether a carbonaceous material is prone to deterioration by propylene carbonate the procedure described below may be followed:

To determine if a carbonaceous material is sensitive to deterioration caused by propylene carbonate coin button cells can be built similar to the procedure described below in the experimental section. Instead of the graphite electrode as described in the procedure the carbonaceous material based electrode is used as negative electrode. As electrolyte a solution of 1 M $LiPF_6$ in PC:DMC (1:1 by wt.) has to be used. Carbonaceous materials that are sensitive to deterioration by propylene carbonate show a strong capacity fading and have a capacity retention after 20 cycles that is below 25% based on the theoretical capacity of the cell.

The addition of methylphosphonoyloxymethane effectively prevents deterioration of carbonaceous anode active material by propylene carbonate. According to one embodiment of the invention the anode active material is selected from carbonaceous materials prone to deterioration by propylene carbonate. Preferably the anode active material is selected from carbonaceous materials comprising at least partially graphitic layers, more preferred the anode active material is selected from graphite materials.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, tin (Sn), lead (Pb), aluminum (Al), indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material are silicon based materials. Silicon based materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti.

Preferably the anode active material is selected from carbonaceous material that can reversibly occlude and release lithium ions, particularly preferred the carbonaceous material that can reversibly occlude and release lithium ions is selected from carbonaceous materials prone to deterioration by propylene carbonate, in particular preferred are graphite materials. In another preferred embodiment the anode active is selected from silicon based materials that can reversibly occlude and release lithium ions, preferably the anode comprises a thin film of silicon or a silicon/carbon composite. In a further preferred embodiment the anode active is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive lithium batteries may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several inventive lithium batteries may be combined with one another, for example in series connection or in parallel connection. Series connection is preferred. The present invention further provides for the use of inventive lithium ion batteries as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive lithium ion batteries can also be used for stationary energy stores.

Even without further statements, it is assumed that a skilled person is able to utilize the above description in its widest extent. Consequently, the preferred embodiments and examples are to be interpreted merely as a descriptive enclosure which in no way has any limiting effect at all.

The invention is illustrated by the examples which follow, which do not, however, restrict the invention.

1. Synthesis of the pyridine-$SO_3$ complexes 2-vinyl pyridine-$SO_3$ complex (2-VP $SO_3$) was prepared by taking an excess amount of dichloroethane (100 mL, anhydrous, ACROS) in a flask and adding 4 g of sulfur trioxide into it. Then, 5 mL of 2-vinyl pyridine (>99.0%, Sigma-Aldrich) was added to the solution. The mixture was stirred for one hour, and turned milky. A white solid was obtained and separated from the solvent by vacuum manifold. The product was characterized by $^1H$ nuclear magnetic resonance (NMR) spectroscopy.

Pyridine-$SO_3$ complex (Pyr-$SO_3$), 3-fluoro pyridine-$SO_3$ complex (3-FP $SO_3$), 2-trifluoro ethyl pyridine-$SO_3$ complex (2-TFP $SO_3$), and 4-vinyl pyridine-$SO_3$ complex (4-VP $SO_3$) were prepared analogously.

2. Electrochemical Cells

The baseline electrolyte composition was 1.2 M $LiPF_6$ in a mixture of ethylene carbonate (EC) and ethyl methyl carbonate (EMC) (3/7 v/v). 0.5 wt.-% or 0.1 wt.-% of the different pyridine-$SO_3$ complexes were added to this baseline electrolyte composition. "wt.-%" are based on the total weight of the electrolyte composition.

2032-type cells were built with Elexcel cathode (d=14.7 mm) comprising a composite of 92 wt.-% $LiNi_{0.5}Mn_{1.5}O_4$, 4 wt.-% conductive carbon and 4 wt.-% polyvinyliden fluoride and Elexcel graphite anode (d=15.0 mm), a trilayer polypropylene/polyethylene (PP/PE/PP) separator (d=19 mm, Celgard), and one layer of glass fiber separator (d=16 mm, thickness=0.67 mm, Whatman) and 100 microL of electrolyte in each cell in an Argon-filled glove box in which the water content is smaller than 0.1 ppm. Cells were cycled on an Arbin cycler and the temperature was controlled by Fisher Scientific Isotemp Incubators.

3. Cycling performance $LiNi_{0.5}Mn_{1.5}O_4$/graphite cells were cycled at 25° C. initially with the following cycling protocol: C/20 for the first cycle; C/10 for the second and third cycle; and then C/5 for the remaining at 25° C. After 25° C. cycling, cells were transferred to 45° C. to perform C/5 cycling for 50 cycles. Cells were charged with a CC-CV mode, constant current charge to 4.25 to 4.8 V and followed by a constant voltage charge step 4.8 V vs. $LiC_6/C_6$ until the current decreased to 10% of the applied charging current. Then, cells were discharged to 3.30 V vs. $LiC_6/C_6$ at same constant current (CC mode).

The results of the cycling tests with base line electrolyte (comparative), baseline electrolyte containing 0.5 wt.-% pyridine-$SO_3$ complex (comparative) and baseline electrolyte containing 0.5 wt.-% 2-vinyl pyridine-$SO_3$ complex (inventive) are shown in FIGS. 1a) and 1b).

The efficiency is calculated by equation: Efficiency= (Discharge capacity of $n^{th}$ cycle/Charge capacity of $n^{th}$ cycle)*100%.

The addition of the 2-vinyl pyridine-$SO_3$ complex to the base electrolyte leads to an increase of the specific discharge capacity and the efficiency during high voltage cycling at elevated temperatures whereas the addition of the unsubstituted pyridine-$SO_3$ complex has a detrimental effect both on the specific discharge capacity and the efficiency as shown in FIGS. 1a) and b).

The results of the cycling tests with base line electrolyte (comparative) and baseline electrolyte containing 0.1 wt.-% of the different substituted pyridine-$SO_3$ complexes (inventive) are shown in FIGS. 2 to 5. All electrolyte compositions containing a pyridine-SO$_3$ complex of formula (I) show increased specific discharge capacity and efficiency compared to the base line electrolyte.

What is claimed is:

1. An electrolyte composition, comprising:
   (i) at least one aprotic organic solvent;
   (ii) at least one conducting salt; and
   (iii) at least one pyridine-SO$_3$ complex of formula (I)

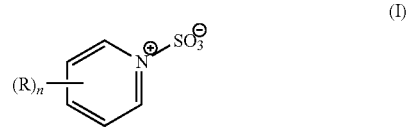

(I)

wherein
R is selected independently at each occurrence from F, C$_1$ to C$_{10}$ alkyl, C$_2$ to C$_{10}$ alkenyl, and C$_2$ to C$_{10}$ alkynyl, wherein alkyl, alkenyl, and alkynyl may be substituted by one or more substituents selected from F and CN; and
n is an integer selected from 1, 2, 3, 4, and 5.

2. The electrolyte composition of claim 1, wherein the electrolyte composition comprises 0.01 to 5 wt.-% of the at least one pyridine-SO$_3$ complex of formula (I), based on a total weight of the electrolyte composition.

3. The electrolyte composition of claim 1, wherein at least one R is F.

4. The electrolyte composition of claim 1, wherein n is 1 or 2.

5. The electrolyte composition of claim 1, wherein at least one R is selected from C$_2$ to C$_{10}$ alkenyl which may be substituted by one or more substituents selected from F and CN.

6. The electrolyte composition of claim 1, wherein at least one R is selected from C$_2$ to C$_{10}$ alkynyl which may be substituted by one or more substituents selected from F and CN.

7. The electrolyte composition of claim 1, wherein at least one R is selected from C$_1$ to C$_{10}$ alkyl which may be substituted by one or more substituents selected from F and CN.

8. The electrolyte composition of claim 1, wherein the at least one pyridine-SO$_3$ complex of formula (I) is selected from 2-vinyl pyridine sulfur trioxide, 3-vinyl pyridine sulfur trioxide, 4-vinyl pyridine sulfur trioxide, 2-trifluoromethyl pyridine sulfur trioxide, 3-trifluoromethyl pyridine sulfur trioxide, 4-trifluoromethyl pyridine sulfur trioxide, 2-fluoro pyridine sulfur trioxide, 3-fluoro pyridine sulfur trioxide, 4-fluoro pyridine sulfur trioxide, 2-propargyl pyridine sulfur trioxide, 3-propargyl pyridine sulfur trioxide, 4-propargyl pyridine sulfur trioxide, and mixtures thereof.

9. The electrolyte composition of claim 1, wherein the at least one aprotic organic solvent (i) is selected from optionally fluorinated cyclic and acyclic organic carbonates, optionally fluorinated acyclic ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles, optionally fluorinated cyclic and acyclic phosphates, and mixtures thereof.

10. The electrolyte composition of claim 1, wherein the at least one aprotic organic solvent (i) is selected from optionally fluorinated C$_1$-C$_{10}$-alkylethers, optionally fluorinated cyclic and acyclic organic carbonates, and mixtures thereof.

11. The electrolyte composition of claim 1, wherein the at least one conducting salt (ii) is selected from lithium salts.

12. The electrolyte composition of claim 1, wherein the electrolyte composition further comprises at least one additive (iv) selected from the group consisting of film forming additives, flame retardants, overcharging additives, wetting agents, HF and/or H$_2$O scavengers, stabilizers for LiPF$_6$ salt, ionic solvation enhancers, corrosion inhibitors, and gelling agents.

13. An electrochemical cell comprising:
    an anode comprising an anode film; and
    a cathode comprising a cathode film,
    wherein the anode film and the cathode film each independently comprise the electrolyte composition of claim 1.

14. An electrochemical cell, comprising:
    an anode comprising a film forming additive; and
    a cathode comprising the film forming additive,
    wherein the film forming additive comprises a pyridine-SO$_3$ complex of formula (I)

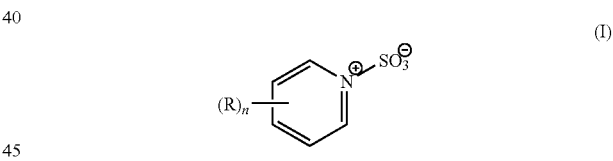

(I)

wherein
R is selected independently at each occurrence from F, C$_1$ to C$_{10}$ alkyl, C$_2$ to C$_{10}$ alkenyl, and C$_2$ to C$_{10}$ alkynyl, wherein alkyl, alkenyl, and alkynyl may be substituted by one or more substituents selected from F and CN; and
n is an integer selected from 1, 2, 3, 4, and 5.

* * * * *